O. L. WHITEMAN.
VALVE.
APPLICATION FILED APR. 29, 1915.

1,164,150.

Patented Dec. 14, 1915.

Witnesses
W. A. Williams
Geo. P. Wright

Inventor
O. L. Whiteman.
By E. B. Stocking
Attorney

COLUMBIA PLANOGRAPH CO., WASHINGTON, D. C.

UNITED STATES PATENT OFFICE.

OWEN L. WHITEMAN, OF COXSACKIE, NEW YORK.

VALVE.

1,164,150.  Specification of Letters Patent.  Patented Dec. 14, 1915.

Application filed April 29, 1915. Serial No. 24,761.

*To all whom it may concern:*

Be it known that I, OWEN L. WHITEMAN, a citizen of the United States, residing at Coxsackie, in the county of Greene and State of New York, have invented certain new and useful Improvements in Valves, of which the following is a specification, reference being had therein to the accompanying drawing.

This invention relates to certain new and useful improvements in valves especially adapted to be used in connection with radiators and more particularly to the means for holding the hard rubber disk in the disk holder so as to enable the same to be readily inserted or removed.

Another object of my invention is to provide a disk holder which is formed of two members threaded together having means for clamping the hard rubber disk between said members in such a manner that the same is securely held in position, and in such a manner that the securing means will not interfere with the valve seat.

Another and further object of the invention is to provide a disk holder for valves in which means is provided for attaching the same to the valve stem in such a manner that the same is swiveled thereon in order to allow the valve stem to turn freely within the holder.

Other and further objects and advantages of the invention will be hereinafter set forth and the novel features thereof defined by the appended claims.

Figure 1:
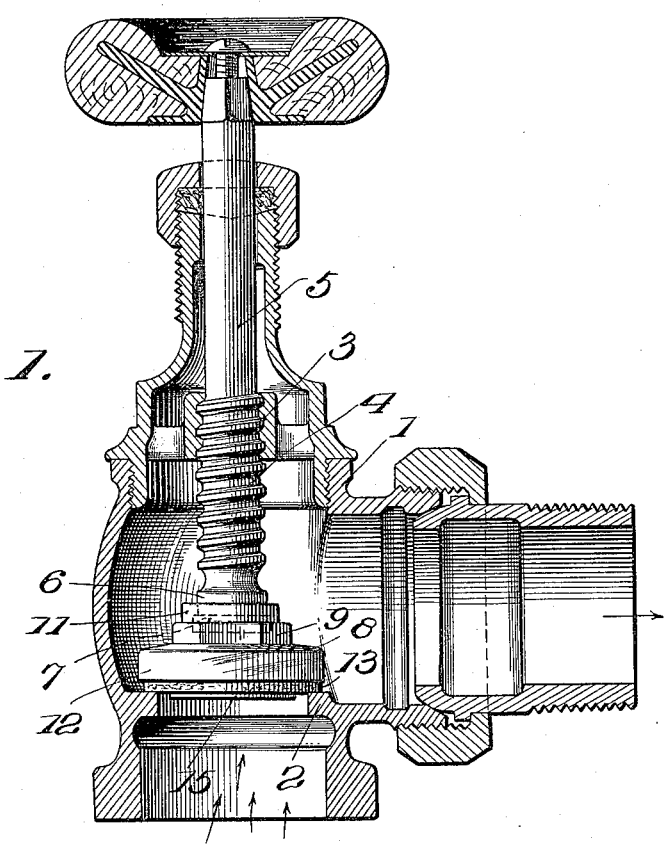
Figure 2:
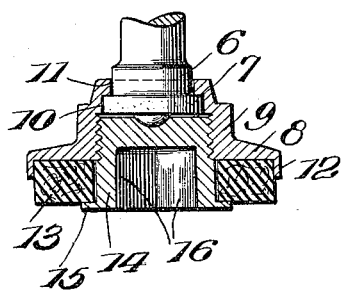
Figure 3:
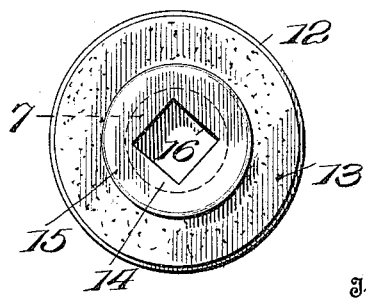

In the drawing—Figure 1, is a longitudinal section through a radiator valve casing, showing the application of my improved construction of disk holder; Fig. 2, is a vertical section through the disk holder, the valve stem being shown in elevation; and Fig. 3, is an inverted plan view of the holder.

Like numerals of reference refer to like parts in the several figures of the drawing.

In the drawing 1 indicates a valve casing provided with a valve seat 2 and a threaded nut member 3 in which is mounted, a threaded portion 4 of a valve stem 5 which is provided with the usual wooden wheel for turning the same.

The lower end of the valve stem 5 is provided with a head portion 6 having an annular flange 7 as clearly shown in Fig. 2, on which is swiveled my improved construction of disk holder.

The disk holder comprises a circular disk-shaped member 8 provided with an internally threaded neck portion 9 which terminates in a reduced portion 10 into which the annular flange 7 of the valve stem head is adapted to extend; said head being held within said portion by an annular inwardly projecting flange 11 which extends over the flange of the head so as to support the disk-shaped member upon the lower end of the head of the valve stem in such a manner that the same is free to turn.

In inserting the member 8, the same is placed over the upper end of the valve stem and is allowed to drop until the flange 11 engages the flange of the head.

The member 8 is provided with an annular depending flange 12 forming an annular seat in which is adapted to be arranged a hard rubber disk 13 forming a valve face which is adapted to coöperate with the seat 2 of the valve casing 1, said disk being held within its seat by a screw 14 working in the threaded portion 9 of the disk-shaped member 8, said screw being provided with an annular laterally projecting flange 15 engaging the face of the valve disk 13, so as to hold the same securely in the seat.

The screw is provided with a square opening 16 to receive a suitable wrench for screwing the same into position so as to clamp the hard rubber disk, and it will be seen by this construction, that the hard rubber disk forming the valve face is secured within the member swiveled on the end of the valve stem in such a manner that the same is securely held in position between the flanges of the respective members.

From the foregoing description, it will be seen that I have provided novel means for securing the hard rubber disk forming the valve face in the holder which comprises two members threaded together in such a manner that the disk forming the valve face is secured in position within the holder and at the same time, the holder is secured upon the lower end of the valve stem in such a manner that the valve stem is free to rotate therein.

It will also be seen that the head portion 6 of the valve stem 5 is provided with a depending centrally disposed semi-spherical boss adapted to fit within a circular recess formed in the screw 14 so as to hold the holder in position upon the head in such a manner that the holder is centered upon the stem.

I claim:

1. The combination with a valve stem provided with a head having a centrally disposed depending semi-spherical boss, of a disk holder swiveled on said head, and a disk retaining screw mounted in said holder having a centrally disposed semi-spherical recess to receive said boss for centering said holder upon said stem.

2. The combination with a valve stem having an enlarged head provided with an annular flange and a centrally disposed depending semi-spherical boss, of a disk-shaped member provided with an internally threaded neck having a portion to receive said head to allow said head to rotate therein, said disk-shaped member having an annular flange forming a seat surrounding the internally threaded neck, a disk arranged within said seat, a flanged screw working in said threaded neck for locking said disk within said seat, said screw being provided at its end with a semi-spherical recess to receive the boss of said stem for centering said disk-shaped holder upon said stem.

3. The combination with a valve stem, provided with an enlarged head having an annular flange and a depending centrally disposed semi-spherical boss, of a disk-shaped member having an internally threaded neck terminating in a reduced portion adapted to receive the annular flange of the stem, said neck having an annular flange extending over the flange of the head, a peripheral annular flange depending from said disk-shaped member forming an annular seat, a packing disk arranged within said seat having a central opening, a screw having a threaded end portion working in the threaded neck portion of said member, said screw having an annular laterally projecting flange engaging said packing disk, the end of said screw having a semi-spherical opening to receive the semi-spherical boss of the stem.

In testimony whereof I hereunto affix my signature in the presence of two witnesses.

OWEN L. WHITEMAN.

Copies of this patent may be obtained for five cents each, by addressing the "Commissioner of Patents, Washington, D. C."